(12) United States Patent
Shimizu et al.

(10) Patent No.: US 6,667,467 B2
(45) Date of Patent: Dec. 23, 2003

(54) MICROPROBE AND SCANNING PROBE APPARATUS HAVING MICROPROBE

(75) Inventors: Nobuhiro Shimizu, Chiba (JP); Hiroshi Takahashi, Chiba (JP); Yoshiharu Shirakawabe, Chiba (JP); Jurgen P. Brugger, AE Enschede (NL); Walter Häberle, Ruschlikon (CH); Gerd K. Binnig, Russchliken (CH); Peter Vettiger, Russchlikon (CH)

(73) Assignee: Seiko Instruments Inc., Chiba (JP)

( * ) Notice: Subject to any disclaimer, the term of this patent is extended or adjusted under 35 U.S.C. 154(b) by 15 days.

(21) Appl. No.: 09/803,862

(22) Filed: Mar. 12, 2001

(65) Prior Publication Data

US 2002/0020805 A1 Feb. 21, 2002

(30) Foreign Application Priority Data

Mar. 13, 2000 (JP) ......................................... 2000-069275

(51) Int. Cl.[7] ............................ G02B 27/40; G02B 27/64
(52) U.S. Cl. ...................................... 250/201.3; 250/306
(58) Field of Search .............................. 250/201.3, 306, 250/307, 309, 443.1, 234; 73/105

(56) References Cited

U.S. PATENT DOCUMENTS

| 5,266,801 | A | * | 11/1993 | Elings et al. | ............... 250/306 |
| 5,444,244 | A | * | 8/1995 | Kirk et al. | ................... 250/306 |
| 5,595,942 | A | * | 1/1997 | Albrecht et al. | ............... 438/52 |
| 6,028,305 | A | * | 2/2000 | Minne et al. | ................ 250/234 |
| 6,079,255 | A | * | 6/2000 | Binnig et al. | .................. 73/105 |
| 6,237,399 | B1 | * | 5/2001 | Shivaram et al. | ............. 73/105 |
| 6,383,823 | B1 | * | 5/2002 | Takahashi et al. | ............. 438/14 |
| 2001/0028033 | A1 | * | 10/2001 | Shimizu et al. | ............. 250/309 |

* cited by examiner

Primary Examiner—Que T. Le
Assistant Examiner—Eric J Spears
(74) Attorney, Agent, or Firm—Adams & Wilks

(57) ABSTRACT

The present invention provides a microprobe capable of simplifying constitution, capable of promoting measurement accuracy of sample face and capable of dispensing with alignment adjustment at each measurement and a scanning type probe apparatus using thereof.

The present invention includes a low resolution cantilever portion supported by a support portion and integrally formed with heater laminating portions, heater portions formed at the heater laminating portions, piezoresistive elements provided at bending portions and a movable portion having a low resolution stylus and a high resolution cantilever portion supported by the support portion and integrally formed with piezoresistive elements provided at the bending portions and a movable portion having a high resolution stylus.

10 Claims, 10 Drawing Sheets

MICROPROBE AND SCANNING PROBE APPARATUS HAVING MICROPROBE

BACKGROUND OF THE INVENTION

1. Field of the Invention

The present invention relates to a microprobe used for observing a very small area (on a nanometer order) of a surface of a sample and a scanning type probe apparatus using the microprobe.

2. Description of the Prior Art

Currently, there is known a Scanning Probe Microscope (SPM) as one of the microscopes (scanning type probe apparatus) used for observing a very small area on a nanometer order at a surface of a sample. One type of scanning type probe microscope, an Atomic Force Microscope (AFM), uses a cantilever provided with a stylus at its front end portion as a microprobe, the stylus of the cantilever is scanned along a surface of a sample, and interactive action (an attractive force or repulsive force, or the like) between the surface of the sample and the stylus is detected as an amount of bending of the cantilever to thereby enable one to measure a shape of the surface of the sample.

The bending amount of the cantilever is detected by irradiating a front surface of the cantilever with an irradiation beam such as a laser beam and measuring a reflection angle of a beam reflected from the front surface of the sample. Actually, the reflection angle is provided by using an optical detector of a photodiode or the like divided in two and from an intensity distribution of the beam received at respective detecting portions.

In observing the sample by AFM, generally, there is selected a cantilever having sharp stylus which differs in sharpness in accordance with observation accuracy and observation range and the cantilever is used by being mounted to an apparatus. For example, when a wide area of micrometer order is intended to be measured at a high speed, a cantilever having a stylus with a low sharpness degree is used although the resolution is low (hereinafter, referred to as a cantilever for low resolution), further, when a narrow area of nanometer order is intended to measure with high resolution, there is used a cantilever having a stylus with a high sharpness degree (hereinafter, referred to as a cantilever for high resolution).

In this way, there causes a need of interchanging a cantilever in accordance with an object of observation and the interchange operation becomes a troublesome operation of finely adjusting an irradiation angle of the above-described irradiation beam or a receive angle of an optical detector or the like. Further, before and after the interchanging operation, a position of observation is frequently shifted considerably and it is difficult to carry out accurate sample observation.

Hence, there is proposed a microprobe of a double lever type having both of the cantilever for low resolution and the cantilever for high resolution by making common a support portion thereof. Particularly, according to the double lever type microprobe, in accordance with the object of observation, by switching operation utilizing thermal expansion of a heater, switching of the two kinds of cantilevers is made possible.

FIG. 12 is a perspective view showing a microprobe 1 of the double lever type and a constitution of essential portions of a scanning type prove apparatus using the microprobe 1. Further, FIG. 13 is a side view for explaining operation of the double lever type microprobe 1.

In FIG. 12, the microprobe 1 is arranged above a sample 4 and is fabricated with silicon as a base material and a support portion 1a is formed with a cantilever portion 1b for low resolution and a cantilever portion 1d for high resolution. As shown by FIG. 12, the low resolution cantilever portion 1b and the high resolution cantilever portion 1d are supported by the support portion 1a to project in minus y-axis direction designated in the drawing from an end edge of the support potion 1a and to be spaced apart from each other by an interval 1f. Further, in actual use, the support portion 1a is fixed to a fixing member, not illustrated.

Further, the sample 4 is moved in xy plane and in z-axis direction shown in the drawing by actuators, not illustrated, thereby, scanning over the surface of the sample of the microprobe 1 and proximity control between the microprobe 1 and the surface of the sample are achieved.

Further, the low resolution cantilever portion 1b and the high resolution cantilever portion 1d are formed to bend in z-axis direction shown in the drawing with portions thereof bonded to the support portion 1a as bending portions. Further, a front end portion of the low resolution cantilever portion 1b is formed with a sharpened stylus 1c for low resolution to project in minus z-axis direction.

The low resolution stylus 1c is proximate to a sample surface 4a of the sample 4, a sharpness degree thereof is lower than a sharpness degree of a stylus 1e for high resolution, mentioned later, and a length thereof in z-axis direction is longer than a length of the high resolution stylus 1e. That is, the low resolution stylus 1c (low resolution cantilever portion 1b) is used in measuring a wide area with low resolution.

Meanwhile, a front end portion of the high resolution cantilever portion 1d is formed with the sharpened stylus 1e for high resolution to project in minus z-axis direction. According to the high resolution stylus 1e, the sharpness degree is made higher than the sharpness degree of the low resolution stylus 1c and the length in z-axis direction is made shorter than the length of the low resolution stylus 1c. That is, the high resolution stylus 1e (high resolution cantilever portion 1d) is used in measuring a narrow area with high resolution.

As described above, detection of bending of the low resolution cantilever portion 1b and the high resolution cantilever portion 1d is carried out by measuring reflection beam reflected at surfaces of the cantilevers. Detection of bending of the low resolution cantilever portion 1b is carried out such that irradiation beam $La_1$ irradiated from a light emitting element $5_1$ is reflected and reflection beam $Lb_1$ is received by a light receiving element $6_1$. Further, similarly, detection of bending of the high resolution cantilever portion 1d is carried out such that irradiation beam $La_2$ irradiated from a light emitting element $5_2$ is reflected and reflection beam $Lb_2$ is received by a light receiving element $6_2$.

Further, according to the low resolution cantilever portion 1b, as shown by FIG. 13, there is formed a heater 3 for the above-described switching operation on a surface of a side of the low resolution stylus 1c. Particularly, the heater 3 is formed at a bond portion (bending portion) for bonding the low resolution cantilever portion 1b and the support portion 1a, and is heated by conducting electricity thereto via a wiring, not illustrated, and the low resolution cantilever portion 1b can be bent in z-axis plus direction at the heater 3 portion by thermal expansion of the heater 3 per se or by a difference in thermal expansion of a side of the low resolution cantilever portion 1b formed with the heater 3 and a side thereof opposed thereto.

Here, temperature of the heater 3 before bending the low resolution cantilever portion 1b is designated by notation $T_0$ and temperature of the heater 3 for bending the low resolution cantilever portion 1b (operational temperature) is designated by notation $T(>T_0)$.

Therefore, according to a scanning type probe apparatus using the microprobe 1, an initial state, that is, a state in which temperature of the heater 3 is $T_0$, is set to a state in which the low resolution stylus 1c having a height higher than that of the high resolution stylus 1e can be used as a state in which the low resolution stylus 1c is more proximate to the sample surface 4a than the high resolution stylus 1e and under the state, observation of a wide area with low resolution can be carried out.

Further, when the low resolution cantilever portion 1b is bent in z-axis plus direction by elevating temperature of the heater 3 to the operational temperature T by flowing current to the heater 3, in this state, there is brought about a state in which the side of the high resolution stylus 1e becomes more proximate to the sample surface 4a than the low resolution stylus 1c and accordingly, observation of a narrow area with high resolution can be carried out.

Hence, according to the above-described double lever type microprobe, the stylus can be switched to an exclusive stylus for carrying out either of observation of a wide area with low resolution and observation of a narrow area with high resolution without executing the interchanging operation of the microprobe.

However, according to the microprobe 1 and a scanning type probe apparatus using thereof, necessarily, there are needed two routes of detecting units of a detecting unit for detecting the bending amount of the low resolution cantilever portion 1b (light emitting element $5_1$ and light receiving element $6_1$) and a detecting unit for detecting the bending amount of the high resolution cantilever portion 1d (light emitting element $5_2$ and light receiving element $6_2$).

Therefore, according to the conventional microprobe 1 and a scanning type probe apparatus using thereof, there poses a problem in which it is necessary for the two detecting units to individually carry out fine adjustment of arrangement positions and angles, further, since the two routes of detecting units are needed, the constitution becomes complicated.

Further, according to the conventional microprobe 1 and a scanning type probe apparatus using thereof, since there is present unavoidable dispersion in view of fabrication thereof in detection characteristics of the two routes of detecting units, there poses a problem in which the measurement accuracy is deteriorated by the dispersion as a matter of fact.

Hence, conventionally, in order to resolve the problem by the two routes of detecting units, there is conceivable a constitution in which there is used one route of a detecting unit using light of light beam having a diameter large enough to cover both of the respective front end portions of the low resolution cantilever portion 1b and the high resolution cantilever portion 1d in place of the two routes of the detecting units.

However, according to the constitution having the one route of a detecting unit, in comparison with the constitution having the two routes of detecting units, there is achieved an advantage of capable of simplifying the constitution, however, in consideration of the fact that the diameter of the light beam is inversely proportional to the measurement accuracy, a deterioration in the measurement accuracy is induced and therefore, the one route of a detecting unit does not necessarily resolve simultaneously all of the above-described problems.

Further, a description has been given such that according to the conventional microprobe 1 and a scanning type probe apparatus using thereof, at each time of measurement, there is needed fine alignment adjustment of respective arrangement positions and angles of the light emitting elements 51 and 52 and the light receiving elements 61 and 62, actually, since the measurement order is an extremely small order of nanometer and accordingly, there also poses a problem in which fine position and angle adjustment needs to be repeated a number of times which requires very troublesome operations for a long period of time.

The invention has been carried out in view of such background and it is an object thereof to provide a microprobe capable of simplifying a constitution thereof, capable of promoting the accuracy of measuring a sample face and capable of dispensing with alignment adjustment each time a measuring operation is performed and a scanning type probe apparatus using the microprobe.

SUMMARY OF THE INVENTION

In order to resolve the above-described problem and achieve the object, the present invention includes a low resolution cantilever portion supported by a support portion and integrally formed with heater laminating portions, heater portions formed at the heater laminating portions, piezoresistive elements provided at bending portions and a movable portion having a low resolution stylus and a high resolution cantilever portion supported by the support portion and integrally formed with piezoresistive elements provided at the bending portions and a movable portion having a high resolution stylus.

DETAILED DESCRIPTION OF THE PREFERRED EMBODIMENT

Figure 1:
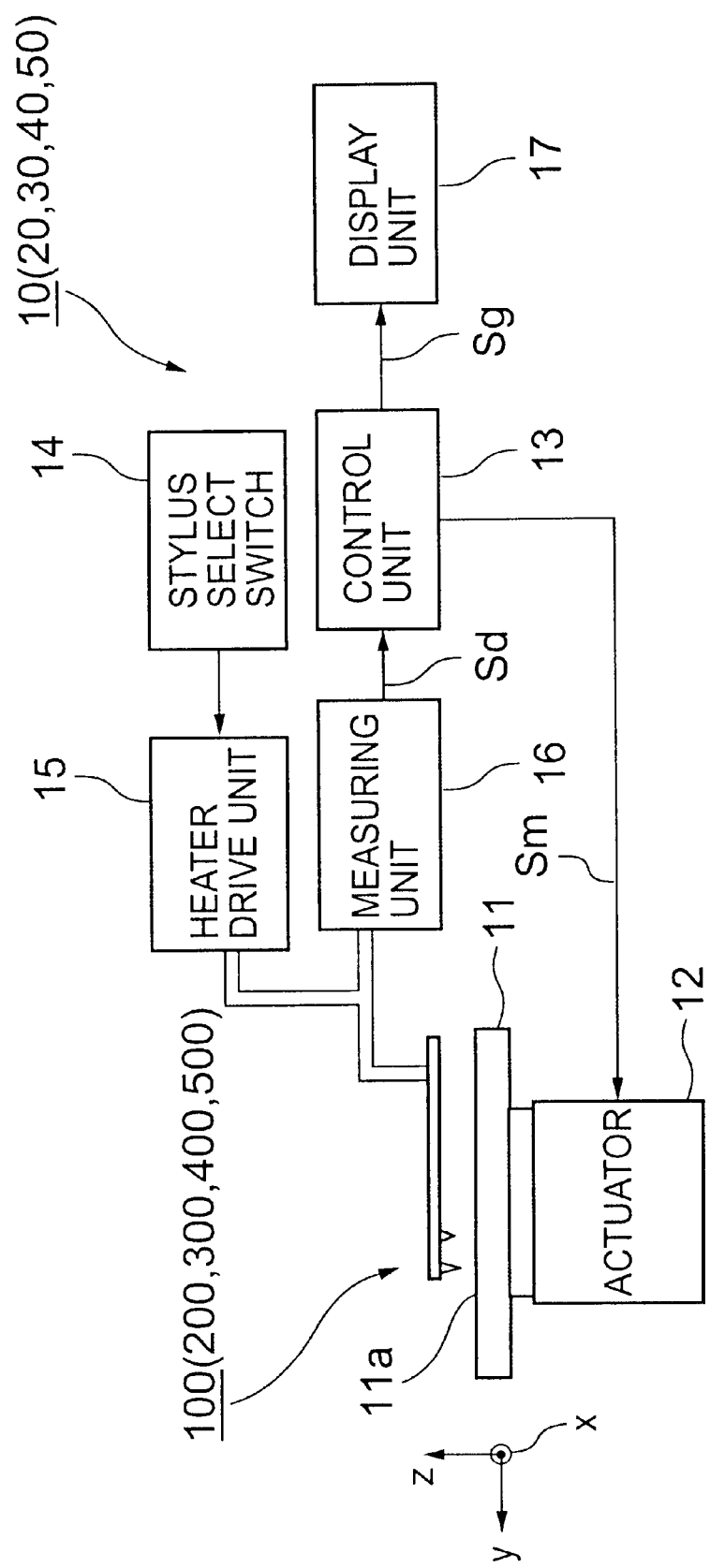
FIG. 1 is a view showing constitutions of microprobes 100, 200, 300, 400 and 500 and scanning type probe apparatus 10, 20, 30, 40 and 50 according to Embodiments 1, 2, 3, 4 and 5 of the invention.

In the following, the principal of the present invention will be described.

In order to resolve the above-described problem and achieve the object, according to claim 1, there is provided a microprobe characterized in that in a microprobe provided with a first cantilever portion having a stylus having a first degree of sharpness and a second cantilever portion having a stylus having a second degree of sharpness at a support portion and arranged with heating means at a connecting portion for connecting the first cantilever portion and the support portion for bending the first cantilever portion by the heating means wherein piezoresistive elements are respectively formed at a first bending portion connecting the first cantilever portion and the heating means and a second bending portion connecting the second cantilever portion and the support portion and bending amounts of the first cantilever portion and the second cantilever portion are detected as changes in resistance values of the piezoresistive elements.

According to the invention described in claim 1, when the stylus having the second degree of sharpness is made effective by using the second cantilever portion, by thermal expansion provided by the heating means connected to the first cantilever portion, the first cantilever portion is bent such that the stylus having the first degree of sharpness is separated from the sample surface constituting an observation object. Thereby, the stylus having the second degree of sharpness can be made to be proximate to the sample surface.

Meanwhile, when the stylus having the first degree of sharpness is made effective by using the first cantilever portion, the heating means is not driven and the first cantilever portion is not bent. In the state, the stylus having the first degree of sharpness is previously made to be more proximate to the sample surface.

Under these states, when the sample surface is scanned by the stylus which is made effective, the cantilever portion which is made effective in accordance with mutual action operated between the sample surface and the stylus, is bent with the bending portion as a fulcrum. The bending amount is detected as a resistance value of the piezoresistive element constituting a measurement result in correspondence with a state of the sample surface.

According to claim 2, there is provided a microprobe characterized in comprising a movable portion having a stylus having a first degree of sharpness and a stylus having a second degree of sharpness wherein piezoresistive elements are respectively formed at a first bending portion connecting a first lever portion provided at a support portion and the movable portion and a second bending portion connecting a second lever portion provided at the support portion and arranged with heating means and the movable portion, the first lever portion is bent by the heating means and a bending amount of the movable portion is detected as changes in resistance values of the piezoresistive elements.

According to the invention described in claim 2, the movable portion is provided with the styluses having two kinds of the degrees of sharpness, by driving the heating means, the stylus which is made effective in the styluses can be selected and accordingly, the constitution can further be simplified.

According to claim 3, there is provided the microprobe, characterized in that the stylus having the first degree of sharpness and the stylus having the second degree of sharpness are arranged on the movable portion such that a line segment connecting the respective styluses is inclined by a predetermined angle to a line segment connecting the first bending portion and the second bending portion.

According to the invention described in claim 3, the line segment connecting the stylus having the first degree of sharpness and the stylus having the second degree of sharpness, is inclined by the predetermined angle to the line segment connecting the first bending portion and the second bending portion and accordingly, a rotational amount in rotating the movable portion with the second bending portion as a rotating axis is increased.

According to claim 4, there is provided the microprobe according to any one of claims 1 through 3, characterized in that the heating means is constituted by the piezoresistive element and generates heat by supplying current to the piezoresistive element.

According to the invention described in claim 4, resistance heat generated by flowing current to the piezoresistive element is used as the heating means and accordingly, the heating means can be driven electrically and bending of the lever portion of the microprobe can easily be controlled.

According to claim 5, there is provided a scanning type probe apparatus, characterized in that in a scanning type probe apparatus for observing a sample surface by detecting a bending amount of a microprobe by a mutual action produced between a stylus and the sample surface by making the sharpened stylus provided at the microprobe proximate to the sample surface wherein the scanning type probe apparatus uses the microprobe according to any one of claims 1 through 4 as the microprobe, further comprising driving means for driving the heating means provided at the microprobe.

According to the invention described in claim 5, the microprobe according to any one of claims 1 through 4 is used, the stylus in accordance with an object of observing the sample can be selected by the driving means for driving the heating means provided at the microprobe and troublesome operation of interchanging the microprobe can be eliminated.

A detailed explanation will be given of embodiments 1 through 5 of a microprobe and a scanning type probe apparatus using thereof according to the invention in reference to the drawings as follows.

(Embodiment 1)

Figure 2:
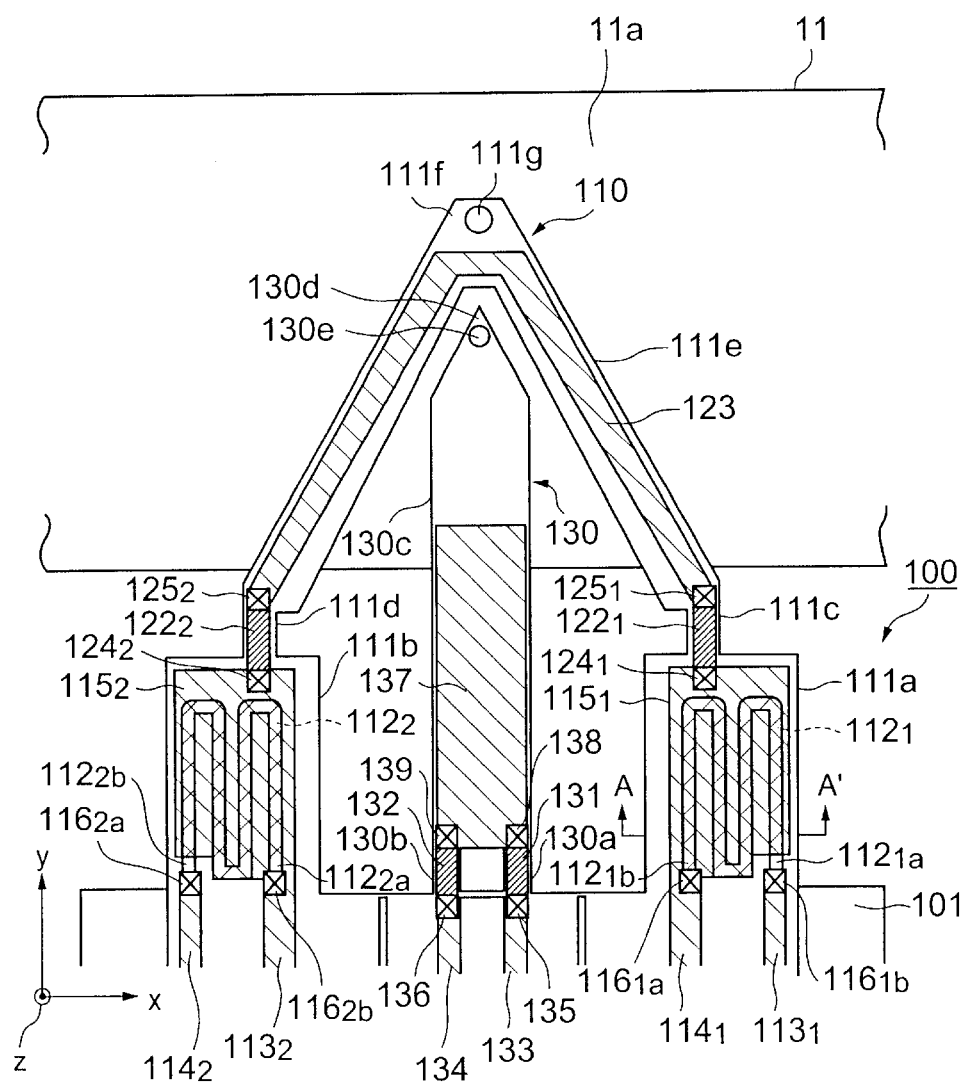
FIG. 2 is an enlarged plane view showing the constitution of the microprobe 100 according to Embodiment 1.
Figure 3:
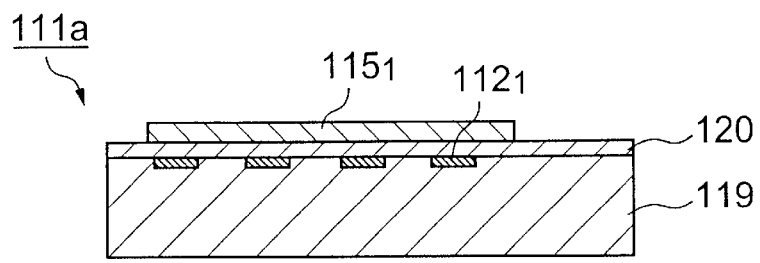
FIG. 3 is a sectional view taken along a line A—A shown in FIG. 2.
Figure 4A:
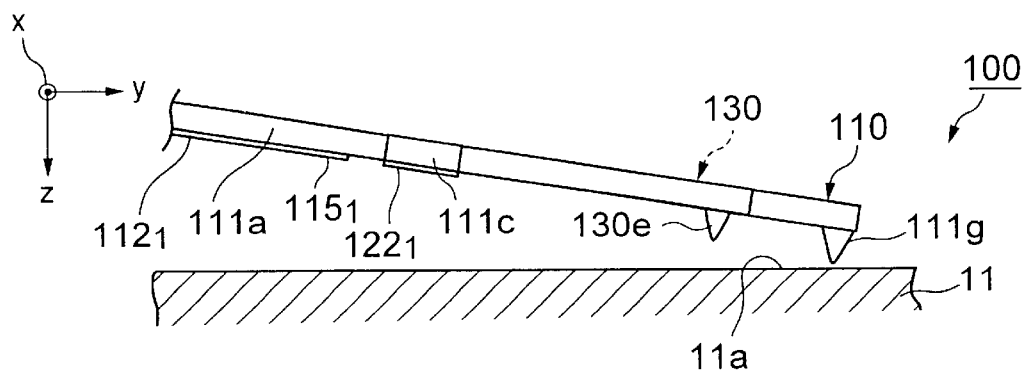
FIG. 4A is a side view showing a state in which the microprobe 100 according to Embodiment 1 of the invention scans a sample surface 11a by a first stylus 111g.
Figure 4B:
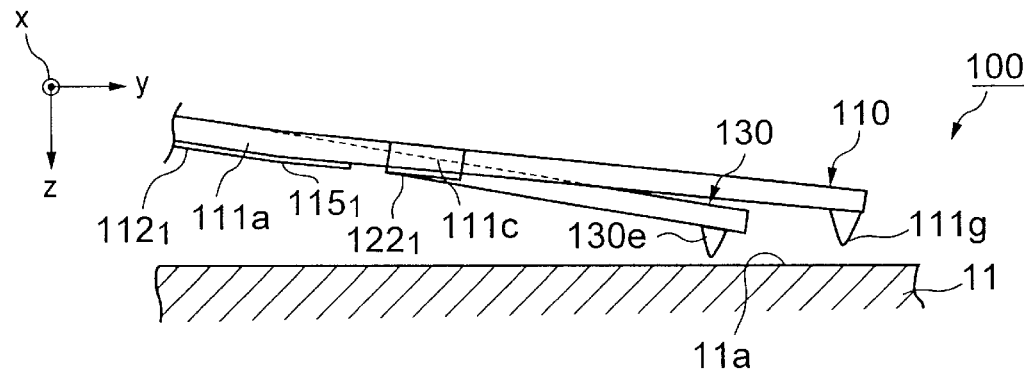
FIG. 4B is a side view showing a state in which the microprobe 100 according to Embodiment 1 of the invention scans the sample surface 11a by a second stylus 130e.

FIG. 1 is a view showing constitutions of a microprobe 100 and a scanning type probe apparatus 10 using thereof according to Embodiment 1 of the invention. FIG. 2 is an enlarged plane view showing the constitution of the microprobe 100 shown in FIG. 1 and FIG. 3 is a sectional view taken along a line A—A shown in FIG. 2. Further, FIG. 4A and FIG. 4B illustrate sectional views of the microprobe 100 shown in FIG. 2.

First, in the scanning type probe apparatus 10 shown in FIG. 1, a sample 11 is an object of measurement and a state of a sample surface 11a thereof is observed. An actuator 12 moves the sample 11 in an xy plane and a z-axis direction shown in the drawing and is controlled to be driven by an actuator drive signal Sm supplied from a control unit 13, mentioned later.

The microprobe 100 is arranged above the sample 11 and detects the state of the sample surface 11a of the sample 11 as a bending amount produced by the above-described mutual action by providing a piezoresistive element on its surface. The microprobe 100 is of a double lever type having two kinds of a cantilever portion for low resolution (cantilever portion 110, mentioned later, refer to FIG. 2) and a cantilever portion for high resolution (cantilever portion 130 for high resolution, mentioned later, refer to FIG. 2), mentioned later, and capable of switching the low resolution cantilever portion and the high resolution cantilever portion by conducting electricity to heater portions (heater portions $112_1$ and $112_2$ mentioned later) in accordance with an object of measurement.

The control unit 13 carries out a drive control with respect to the actuator 12, a processing of deriving a measurement result of the sample surface 11a from a measurement signal Sd inputted from a measuring unit 16, mentioned later, generation of an image signal Sg for displaying the state of the sample surface 11a in an image based on the above-described measurement result and so on. A stylus select switch 14 is a switch for switching the low resolution cantilever portion and the high resolution cantilever portion, mentioned above, and selecting either one of them in measuring operation.

In other words, the stylus select switch 14 is a switch for selecting either one measuring mode of a low resolution wide area measuring mode for making effective the low resolution cantilever portion and a high resolution narrow area measuring mode making effective the high resolution cantilever portion.

Further, a heater drive unit 15 shown in FIG. 1 is a mechanism for flowing current to the above-described heater portions when the high resolution cantilever portion 130 is selected by the stylus select switch 14. Meanwhile, when the low resolution cantilever portion indicated by the stylus select switch 14 is selected, the heater drive unit 15 does not flow current to the heater portions.

Further, the measuring unit 16 is electrically connected to a conductive film 134 and a conductive film 133 shown in FIG. 2, measures respective resistance values of piezoresistive elements (piezoresistive elements $122_1$, and $122_2$, or piezoresistive elements 131 and 132, mentioned later) and outputs the measurement result to the control unit 13 as the measurement signal Sd. A display unit 17 displays the state of the sample surface 11a which is the measurement result by an image based on the image signal Sg inputted from the control unit 13.

Next, a detailed explanation will be given of the constitution of the above-described microprobe 100 in reference to FIG. 2 and FIG. 3. The microprobe 100 shown in FIG. 2 is formed with a support portion 101, the low resolution cantilever portion 110 supported by the support portion 101 flexibly in the z-axis direction shown in the drawing and the high resolution cantilever portion 130 supported similarly by the support portion 101 flexibly in the z-axis direction.

The low resolution cantilever portion 110 is used in the low resolution wide area measuring operation, mentioned above, meanwhile, the high resolution cantilever portion 130 is used for the high resolution narrow area measuring operation.

The lower resolution cantilever portion 110 is fabricated by a silicon material and is constituted by a heater laminating portion 111a, a heater laminating portion 111b, a bending portion 111c, a bending portion 111d and a movable portion 111e. heater laminating portions 111a and 111b are respectively extended in plus y-axis direction from an end edge of the support portion 101 and respectively arranged spaced apart from each other in x-axis direction at a constant interval.

As shown by FIG. 3, the heater laminating portion 111a is constituted by the heater portion $112_1$, comprising a piezoresistive element formed by implanting ions on a silicon substrate 119, an insulating layer 120 of $SiO_2$ or the like formed on surfaces of the silicon substrate 119 and the heater portion $112_1$, and a conductive film $115_1$, formed on a surface of the insulating layer 120. Therefore, the insulating layer 120 is formed for ensuring insulation between the heater wiring $112_1$, and the conductive film $115_1$.

Further, as mentioned later, the conductive film $115_1$, plays a roll as a wiring for electrically connecting a conductive film $114_1$, and one end portion of the piezoresistive element $122_1$, and a wiring for electrically connecting the conductive film $115_2$ and the piezoresistive element $122_2$ and also achieves a function for efficiently transmitting heat generated at the heater portion $112_1$ to the surface of the silicon substrate 119.

A movable portion 111e is formed substantially in an inverse V-like shape in plane view and is connected to respective end edges of the heater laminating portions 111a and 111b via the bending portions 111c and 111c flexibly in z-axis direction shown in the drawing. In this case, widths of the bending portions 111c and 111d are formed narrower than those in other portions.

At a front end portion 111f of the movable portion 111e, on this side of paper in z-axis shown in FIG. 2, there is formed a stylus 111g for low resolution, a front end portion of which is sharpened. As shown by FIG. 4(A), the low resolution stylus 111g is disposed at a position proximate to the sample surface 11a of the sample 11 and a sharpness degree thereof is lower than a sharpness degree of the high resolution stylus 130e, mentioned later. That is, the low resolution stylus 111g (low resolution cantilever portion 110) is used in measuring a wide area with low resolution.

A conductive film $113_1$ and the conductive film $114_1$ are formed respectively in thin films spaced apart from each other at a constant distance on a surface of the support portion 101 and at a vicinity of the heater laminating portion 111a and plays a role as wirings for supplying current to the heater portion $112_1$, mentioned above. Further, one end portion $112_{1a}$ and other end portion $112_{1b}$ of the heater portion $112_1$ are connected to the conductive films $114_1$ and $113_1$ respectively via a metal contact portion $116_{1b}$ and a metal contact portion $116_{1a}$.

Further, the piezoresistive element $122_1$ is formed in a thin film and in a strip-like shape on a surface of the bending portion 111c by ion implantation process or the like and is provided with a characteristic in which a resistance value thereof is changed in accordance with pressure applied thereto. That is, by the characteristic, the piezoresistive element $122_1$ can detect a change in a bending amount of the bending portion 111c (low resolution cantilever portion 110) as a change in a resistance value thereof.

Further, one end portion of the conductive film $115_1$ and the conductive film $114_1$ are electrically connected via the metal contact portion $116_{1a}$ and other end portion of the conductive film $115_1$ and one end portion of the piezoresistive element $112_1$ are electrically connected via a metal contact portion $124_1$.

In FIG. 2, a conductive film 123 is formed in a thin film on the surface of the movable portion 111e to connect one end portion of the movable portion 111e with other end portion thereof via the front end portion 111f and plays a role as a wiring. One end portion of the conductive film 123 is electrically connected to other end portion of the piezoresistive element $122_1$ via a metal contact portion $125_1$.

Meanwhile, the heater laminating portion 111b is constructed by a structure in symmetry with the heater laminating portion 111a in the left and right direction and is constructed by a constitution similar to that of the above-described heater laminating portion 111a and accordingly, an explanation thereof will be omitted here. Further, in the drawing, the heater laminating portion 111b, the heater portion $112_2$, a conductive film $113_2$, a conductive film $114_2$, one end portion $112_{2a}$, other end portion $112_{2b}$, a metal contact portion $116_{2b}$, a metal contact portion $116_{2a}$, the conductive film $113_2$, the conductive film $114_2$, the piezoresistive element $112_2$, the bending portion 111d, a metal contact portion $125_2$ and a conductive film $115_2$, successively correspond to the heater laminating portion 111a, the heater portion $121_1$, the conductive film $113_1$, the conductive film $114_1$, the one end portion $112_{2b}$, the other end portion $112_{1a}$, the metal contact portion $116_{1a}$, the metal contact portion $116_{1b}$, the conductive film $114_1$, the conductive film $113_1$, the piezoresistive element $122_1$, the bending portion 111c, the metal contact portion $125_1$ and the conductive film $115_1$.

On the other hand, the high resolution cantilever portion 130 is fabricated by a silicon material similar to the low resolution cantilever portion 110 and is constituted by a bending portion 130a, a bending portion 130b and a movable portion 130c. The high resolution cantilever portion 130 is disposed in an area surrounded by the low resolution cantilever portion 110 and the support portion 101.

The above-described movable portion 130c is formed in an elongated shape having an acute angle portion at a front end portion thereof and is connected to an end edge of the support portion 101 flexibly in z-axis direction shown in the drawing via the bending portions 130a and 130b. In this case, the bending portions 130a and 130b are formed with widths thereof narrower than that of the movable portion 130c.

Further, at a front end portion 130d of the movable portion 130c, on this side of paper in z-axis shown in FIG. 2, there is formed a stylus 111g for high resolution, a front end portion of which is sharpened. As shown by FIG. 4(A), the high resolution stylus 130e is disposed at a position proximate to the sample surface 11a of the sample 11 and the degree of sharpness is higher than degree of sharpness of the low resolution stylus 111g, mentioned above. That is, the high resolution stylus 130e (high resolution cantilever portion 130) is used in measuring a narrow area with high resolution.

Further, the high resolution cantilever portion 130 is arranged by an angle of about 0 through 20 degree relative to the sample surface 11a. Particularly, in FIGS. 4(A) and 4(B), there is shown a case in which the angle is about 10 degree.

The piezoresistive elements 131 and 132 are formed in thin films in a strip-like shape at respective surfaces of the bending portions 130a and 130b by ion implantation process or the like and are provided with a characteristic in which resistance values thereof are changed in accordance with pressure applied thereto. That is, the piezoresistive elements 131 and 132 respectively detect changes in bending amounts of the bending portions 130a and 130b (high resolution cantilever portion 130) as changes in resistance values thereof similar to the piezoresistive elements $122_1$ and $122_2$, mentioned above.

The conductive films 133 and 134 are formed on the surface of the support portion 101, and respectively in thin films spaced apart from each other at a constant distance at the vicinities of the bending portions 130a and 130b and play a role as wirings.

The conductive films 133 and 134 and respective one end portions of the bending portions 130a and 130b are electrically connected respectively via metal contact portions 135 and 136. A conductive film 137 is formed in a thin film on the surface of the movable portion 130c and plays a role as a wiring. One end edge portion of the conductive film 137 and the piezoresistive elements 131 and 132 are electrically connected via metal contact portions 138 and 139. Further, the conductive film 137 may be formed only at vicinities of the metal contact portions 138 and 139 other than being formed over a large portion of the surface of the movable portion 130c as shown by FIG. 2.

Therefore, the stylus select switch 14 shown in FIG. 1 is the switch for selecting either one of the low resolution stylus 111g (low resolution cantilever portion 110) and the high resolution stylus 130e (high resolution cantilever portion 130) shown in FIG. 2 in measuring operation and when the high resolution stylus 130e (high resolution cantilever portion 130) is selected by the stylus select switch 14, the heater drive unit 15 drives the heater portions $112_1$ and $112_2$ by applying voltage to both of the conductive films $113_1$ and $114_1$ and the conductive films $113_2$ and $114_2$.

Next, an explanation will be given of operation of the microprobe 100 and the scanning type probe apparatus 10 using thereof according to Embodiment 1, mentioned above.

(Low Resolution Wide Area Measurement)

First, an explanation will be given of operation in low resolution wide area measuring operation using the low resolution cantilever portion 110 (low resolution stylus 111g) shown in FIG. 2. In the low resolution wide area measuring operation, the low resolution wide area measuring mode is selected by the stylus select switch 14 shown in FIG. 1. Therefore, voltage is not applied from the heater drive unit 15 to the conductive films $114_1$ and $113_1$ and the conductive films $113_2$ and $114_2$ shown in FIG. 2.

Therefore, temperature of the heater laminating portions 111a and 111b becomes equal to or lower than operating temperature T and accordingly, as shown by FIG. 4(A), the low resolution cantilever portion 110 is brought into a state in which the low resolution cantilever portion 110 is not deformed but stays in a linear shape and is disposed on a plane the same as that of the high resolution cantilever 130.

In such a state, a distance between the low resolution stylus 111g and the sample surface 11a illustrated in the drawing, is shorter than a distance between the high resolution stylus 130e and the sample surface 11a and accordingly, in the microprobe 100, the low resolution stylus 111g (low resolution cantilever portion 110) becomes effective.

Further, in measuring operation, the measuring unit 16 shown in FIG. 1 is connected to the conductive films $114_1$ and $113_2$ shown in FIG. 2 and there is formed a closed loop circuit comprising a route of the measuring unit 16→ the conductive film $114_1$→the metal contact portion $116_{1a}$→the conductive film $115_1$→the metal contact portion $124_1$→the piezoresistive element $122_1$→the metal contact portion $125_1$→the conductive film 123→the metal contact portion $115_2$→the piezoresistive element $122_2$→the metal contact portion $124_2$→the conductive film $115_2$→the metal contact portion $116_{2b}$→the conductive film $113_2$→the measuring unit 16.

At this occasion, when the actuator drive signal Sm is outputted from the control unit 13 to the actuator 12 shown in FIG. 1, the actuator 12 is driven and the sample 11 is moved in y direction in xy plane.

Thereby, there is carried out scanning operation by the microprobe 100 at the sample surface 11a, during the scanning operation, mutual action (attractive force or repulsive force or the like) is operated between the low resolution stylus 111g and the sample surface 11a shown in FIG. 4(A) and the low resolution cantilever portion 110 is bent in z-axis direction by a bending amount in accordance with the mutual action with the bending portions 11c and 111d shown in FIG. 2 as fulcrums.

That is, the bending portions 111c and 111d are bent in accordance with the above-described bending amount and in accordance with the bending degree, respective resistance values of the piezoresistive elements $122_1$, and $122_2$ are changed. Further, the resistance values of the piezoresistive elements $122_1$ and $122_2$ are measured by the measuring unit 16 shown in FIG. 1 and the measurement signal Sd is outputted as the measurement result from the measuring unit 16 to the control unit 13.

Thereby, based on the measurement signal Sd, the control unit 13 calculates changes in the resistance values of the piezoresistive element $122_1$, and $122_2$ and generates the image signal Sg in accordance with the state of the sample surface 11a from the changes in the resistance values. Successively, the control unit 13 outputs the above-described image signal Sg as the measurement result to the display unit 17. Thereby, the state of the sample surface 11a as the measurement result is displayed in an image on the display unit 17.

In this case, the measurement result displayed in the display unit 17 is based on the detection result by the low resolution cantilever portion 110 (low resolution stylus 111g) and accordingly, the measurement result is a measurement result of a wide area at the sample surface 11a and is provided with low resolution.

(High Resolution Narrow Area Measurement)

Next, when high resolution narrow area measurement is carried out in place of the above-described low resolution wide area measurement, the high resolution narrow area measuring mode is selected by the stylus select switch 14 shown in FIG. 1. Thereby, voltage is applied from the heater drive unit 15 to the conductive films $114_1$ and $113_1$ and the conductive films $113_2$ and $114_2$ as shown in FIG. 2.

As a result, in the microprobe 100 shown in FIG. 2, there is formed a first closed loop circuit comprising a route of the heater drive unit 15→the conductive film $113_1$→the metal contact portion $116_{1b}$→the heater portion $112_1$→the metal contact portion $116_{1a}$→the conductive film $114_1$→the heater drive unit 15.

Similar thereto, in the microprobe 100, there is formed a second closed loop circuit comprising a route of the heater drive unit 15→the conductive film $113_2$→the metal contact portion $116_{2b}$→the heater portion $112_2$→the metal contact portion $116_{2a}$→the conductive film $114_2$→the heater drive unit 15.

Further, by forming the first and the second closed loop circuits, current is flowed to both of the heater portions $112_1$ and $112_2$ and Joule's heat is generated respectively at the heater portions $112_1$ and $112_2$.

Thereby, temperature of the heater laminating portions 111a and 111b is elevated and the conductive film $115_1$ (and $115_2$) and peripheral portions thereof are thermally expanded gradually. As a result, as shown by FIG. 4(B), the low resolution cantilever portion 110 is bent in plus z-axis direction with the heater laminating portion 111a (and 111b) as the bending portion and the low resolution stylus 111g is separated from the sample surface 11a.

Under the state, the distance between the low resolution stylus 111g of the low resolution cantilever portion 110 and the sample surface 11a becomes longer than the distance between the high resolution stylus 130e of the high resolution cantilever portion 130 on the other hand and the sample surface 11a and accordingly, as the microprobe 100, the low resolution cantilever portion 110 (low resolution stylus 111g) becomes ineffective.

In contrast thereto, the distance between the high resolution stylus 130e of the high resolution cantilever portion and the sample surface 11a is shorter than the distance between the low resolution stylus 111g of the low resolution cantilever portion 110 and the sample surface 11a and accordingly, as the microprobe 100, the high resolution cantilever portion (high resolution stylus 130e) become effective.

Further, in measuring operation, the measuring unit 16 shown in FIG. 1 is connected to the conductive films 133 and 134 shown in FIG. 2 and there is formed a closed loop circuit comprising a route of the measuring unit 16→the conductive 133→the metal contact portion 135→the piezoresistive element 131→the conductive film 137→the metal contact portion 139→the piezoresistive element 132→the metal contact portion 136→the conductive film 134→the measuring unit 16.

At this occasion, when the actuator drive signal Sm is outputted from the control unit 13 to the actuator 12 shown in FIG. 1, the actuator 12 is driven and the sample 11 is moved in y direction in xy plane.

Thereby, there is carried out scanning operation by the microprobe 100 at the sample surface 11a and during the scanning operation, mutual action (attractive force or repulsive force or the like) is operated between the sample surface 11a and the high resolution stylus 130e of the high resolution cantilever portion 130 shown in FIG. 4(B) and the high resolution cantilever portion 130 is bent in z-axis direction by a bending amount in according with the above-described mutual action with the bending portions 130a and 130b shown in FIG. 2 as fulcrums.

That is, bending portions 130a and 130b are bent in accordance with the above-described bending amount and in accordance with the bending degree, respective resistance values of the piezoresistive elements 131 and 132 are changed. Further, the resistance values of the piezoresistive elements 131 and 132 are measured by the measuring unit 16 shown in FIG. 1 and the measurement signal Sd is outputted as the measurement result from the measuring unit 16 to the control unit 13.

Processing thereafter performed by the control unit 13 or the like is the same as that of the above-described operation, and an explanation thereof will be omitted here. Further, the finally provided measurement result is based on the detection result by the high resolution cantilever portion 130 (high resolution stylus 130e) and accordingly, the measurement result is a measurement result of a narrow area at the sample surface 11a and is provided with high resolution.

As has been explained above, according to the microprobe 100 and the scanning type probe apparatus 10 using thereof according to Embodiment 1, mentioned above, there is constructed the constitution in which the bending amounts of the low resolution cantilever portion 110 and the high resolution cantilever portion 130 are detected based on the respective resistance values of the piezoresistive element $122_1$, the piezoresistive element $122_2$, the piezoresistive element 131 and the piezoresistive element 132 and accordingly, in comparison with the conventional constitution of detecting the bending amounts optically, the constitution can be simplified and measurement accuracy of the sample surface 11a can be promoted.

Further, according to the microprobe 100 and the scanning type probe apparatus 10 using thereof according Embodiment 1, mentioned above, there is constructed the constitution in which the first cantilever portion 110 and the second cantilever portion 130, the piezoresistive element $122_1$ and the piezoresistive element $122_2$, and the piezoresistive element 131 and the piezoresistive element 132 for detecting the bending amounts are integrated and accordingly, conventional optical constituent elements for detecting the bending amounts are dispensed with and accordingly, alignment adjustment at each measuring operation can be dispensed with.

Figure 5A:
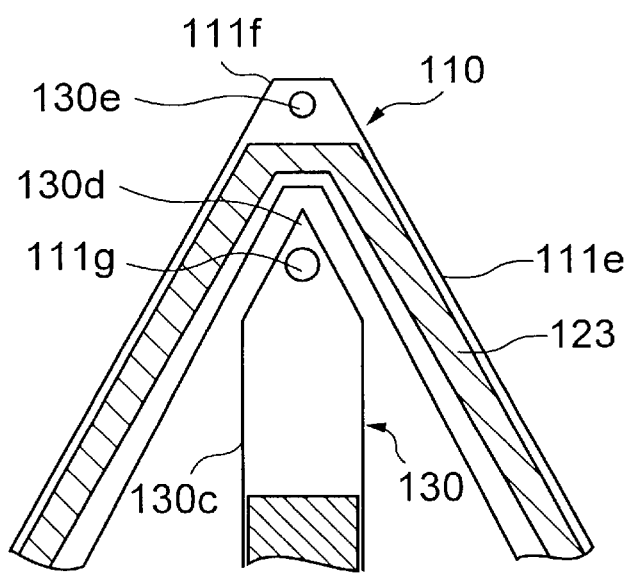
FIG. 5A is an enlarged plane view showing the constitution of the microprobe 100 according to Embodiment 1 of the invention.

Further, according to Embodiment 1, explained above, the low resolution stylus 111g is constituted by the stylus formed at the front end portion 111f of the movable portion 111e and the high resolution stylus 130e is constituted by the stylus formed at the front end portion 130d of the movable portion 130c, however, conversely, as shown by FIG. 5(a), the high resolution stylus 130e can be constituted by a stylus formed at the front end portion 111f and the low resolution stylus 111g can be constituted by a stylus formed at the front end portion 130d.

Figure 5B:
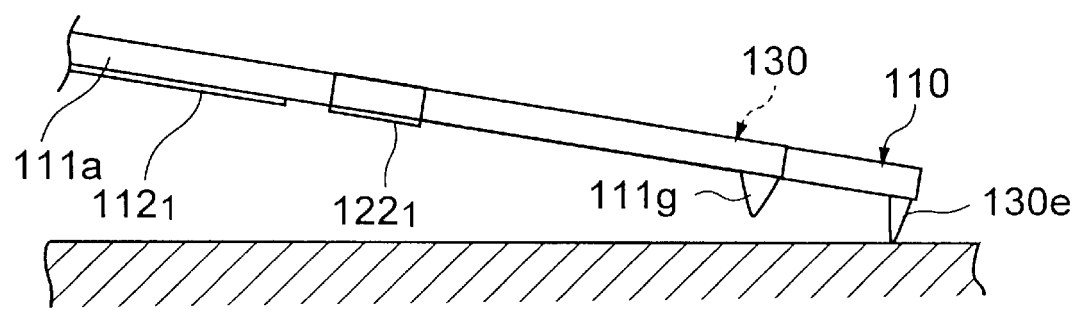
FIG. 5B is a side view showing the constitution of the microprobe 100 according to Embodiment 1 of the invention and is a view showing a state in which the sample surface is scanned by the second stylus 130e.

However, it is necessary to satisfy a condition that the stylus formed at the front end portion of the cantilever portion bent by the heater portions $112_1$ and $112_2$ (in the above-described example, the high resolution cantilever portion), is firstly proximate to the sample in a state in which the cantilever portion is not bent. Therefore, in the case of FIG. 5(A), as shown by FIG. 5(B), in the state in which the cantilever portion is not bent, the side of the high resolution stylus 130e becomes proximate to the sample surface prior to the low resolution stylus 111g.

However, it is preferable to construct a constitution in which the low resolution stylus 111g becomes effective in the above-described bent state of the cantilever portion (heater ON state). This is because in the heater ON state, by generating heat at the heater portions $112_1$ and $112_2$, there is a possibility of mixing thermal noise to a change in current by a piezoresistive element and in this case, it is suitable to make effective the side of the low resolution mode capable of permitting a result having low accuracy. Further, arrangement of the styluses and selection of mode in bending are similar to those in embodiments explained below.

(Embodiment 2)

Next, an explanation will be given of a microprobe according to Embodiment 2 of the invention. The microprobe according to Embodiment 2 is other example of a microprobe having two kinds of styluses detecting bending amounts of cantilever portions by piezoresistive elements and having different degrees of sharpness. Particularly, the microprobe according to Embodiment 2 is different from that in Embodiment 1 in that in the above-described microprobe 100, constitutions in correspondence with the high resolution cantilever portion 130, the bending portions 130a and 130b, the movable portion 130c, the piezoresistive elements 131 and 132, the metal contact portions 135, 136, 138 and 139 and the conductive film 137, are not provided, either one of portions in correspondence with the heater laminating portions 111a and 111b, is made to constitute a member which is projected from the support portion 101 and is not provided with a heater, further, both of two kinds of styluses in correspondence with the low resolution stylus 111g and the high resolution stylus 130 are formed at a portion in correspondence with the movable portion 111f.

Figure 6:
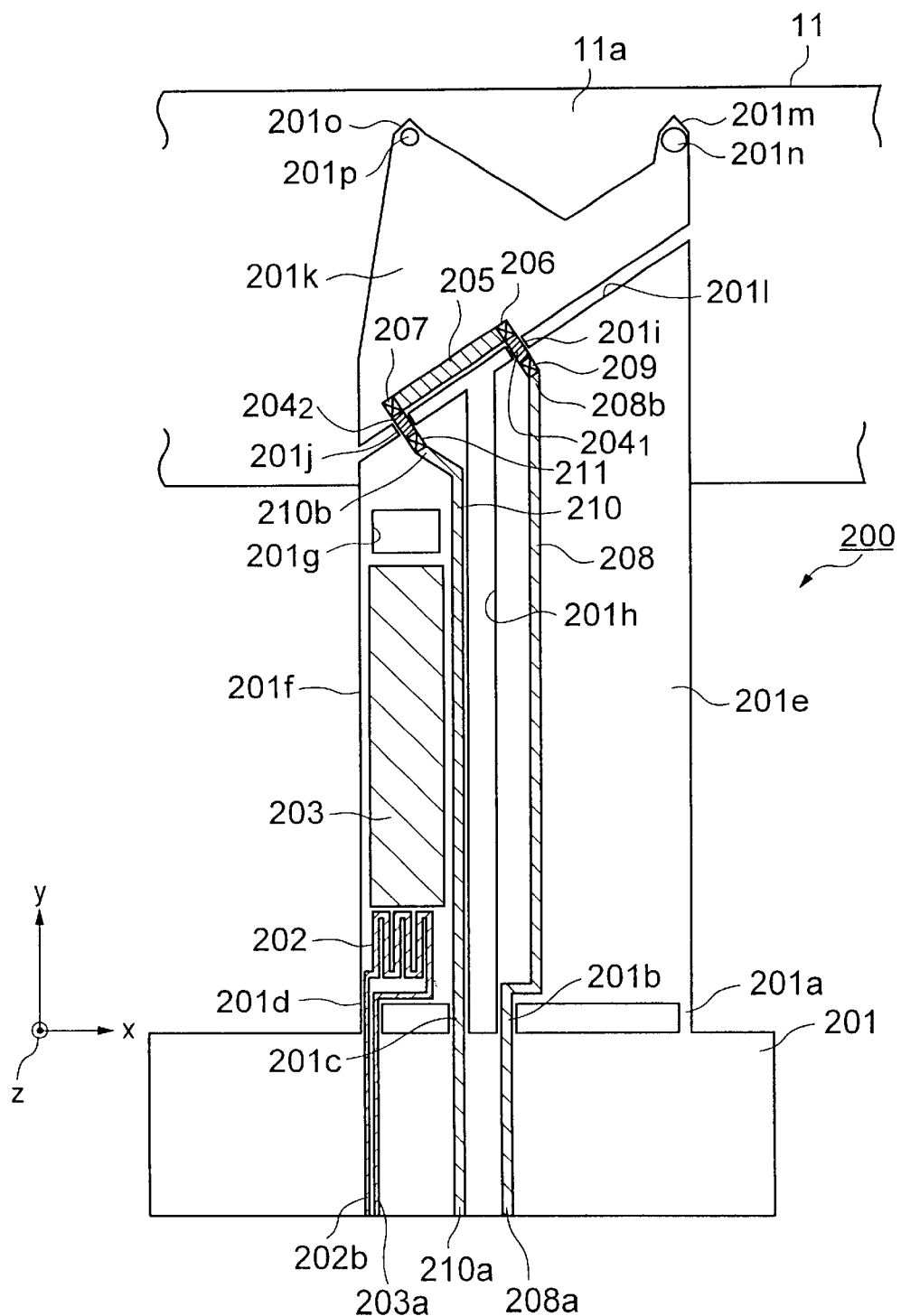
FIG. 6 is a plane view showing the constitution of the microprobe 200 according to Embodiment 2.

FIG. 6 is a plane view showing a constitution of a microprobe 200 according to Embodiment 2. Further, in a scanning type probe apparatus 20 using the microprobe 200 according to Embodiment 2, in place of the microprobe 100 shown in FIG. 1, the microprobe 200 is used.

The microprobe 200 is fabricated by a silicon material and is integrally formed with a support portion 201, a fixing portion 201e supported by an end edge of the support portion 201 via a connecting portion 201a and a connecting portion 201b, a portion 201f similarly supported by the end edge of the support portion 201 via a connecting portion 201c and a connecting portion 201d and a movable portion 201k supported by an end edge of the fixing portion 201e and an end edge of a heater laminating portion 201f via a bending portion 201i and a bending portion 201j flexibly in z-axis direction and rotatably around y axis.

The fixing portion 201e is constituted by a trapezoidal shape, one end edge thereof on the side of the support portion 201 is in parallel with x axis and on the other hand, other end edge thereof on the side of the movable portion 201k is constituted by an oblique side inclined to x axis by a predetermined angle. The fixing portion 201e and the heater laminating portion 201f are provided side by side at a constant interval in x-axis direction and a clearance 201h is formed between the fixing portion 201e and the heater laminating portion 201f.

The heater laminating portion 201f is constituted by a trapezoidal shape, similar to the fixing portion 201e, one end edge thereof on the side of the support portion 201 is in parallel with x axis, on the other hand, other end edge thereof on the side of the movable portion 201k is constituted by an oblique side inclined to x axis by a predetermined angle. Further, a square hole 201g is formed in the heater laminating portion 201f at a vicinity of the movable portion 201k. Further, a clearance 201l is formed between the heater laminating portion 201f and the fixing portion 201e, and the movable portion 201k.

The movable portion 201k is provided with an oblique side inclined to x axis by a predetermined angle along other end edge of the fixing portion 201e and other end edge of the heater laminating portion 201f and is provided with a cantilever portion 201m for low resolution and a cantilever portion 201o for high resolution respectively projected in plus y-axis direction.

Further, the low resolution cantilever portion 201m and the high resolution cantilever portion 201o are formed with a stylus 201n for low resolution and a stylus 201p for high resolution respectively in correspondence with the low resolution stylus 111g and the high resolution stylus 130e in Embodiment 1.

Similar to Embodiment 1, the heater laminating portion 201f is formed with a heater portion 202 comprising a piezoresistive element, which plays a role of heating the heater laminating portion 201f by supplied current. A side of one end portion 203a and a side of other end portion 202b of the heater portion 202 are formed in thin films on the surface of the support portion 201 via the connecting portion 201d.

An aluminum film 203 is formed in a thin film on the surface of the heater laminating portion 201f between the heater portion 202 and the square hole 201g and plays a role of transmitting efficiently heat generated at the heater portion 202 to a surface of a silicon substrate.

A piezoresistive element $204_1$ and a piezoresistive element $204_2$ are for detecting changes in bending amounts at the bending portion 201i and the bending portion 201j similar to the respective piezoresistive elements explained in Embodiment 1.

A conductive film 205 is formed in a thin film and in a strip-like shape on the surface of the movable portion 201k and along the clearance 201*l* and plays a role as a wiring for electrically connecting the piezoresistive element $204_2$ and the piezoresistive element $204_2$ via metal contact portions 206 and 207.

A conductive film 208 is formed in a thin film on a surface from a vicinity of the bending portion 201*i* to the support portion 201 via the connecting portion 201*b* and plays a role as a wiring. Other end portion 208*b* of the conductive film 208 is electrically connected to one end portion of the piezoresistive element $204_1$ via a metal contact portion 209. Further, a conductive film 210 is formed in a thin film on a surface from a vicinity of the bending portion 201*j* to the support portion 201 via the connecting portion 201*c* and plays a role as a wiring. Other end portion 210*b* of the conductive film 210 is electrically connected to one end portion of the piezoresistive element $204_2$ via a metal contact portion 211.

Further, the one end portion 203*a* and the other end portion 202*b* of the heater wiring 202 are electrically connected to the heater drive unit 15 shown in FIG. 1 and the heater drive unit 15 applies voltage to the one end portion 203*a* and the other end portion 202*b* when the low resolution cantilever portion 201*m* (low resolution stylus 201*n*) is used.

Further, the one end portion 208*a* of the conductive film 208 and the one end portion 210*a* of the conductive film 210 are connected to the measuring unit 16 shown in FIG. 1. Further, in the microprobe 200 shown in FIG. 6, a line segment connecting the low resolution stylus 201*n* and the high resolution stylus 201*p* are formed to be inclined to a line segment connecting the bending portion 201*i* and the bending portion 201*j* by a predetermined angle. This is for increasing a rotational angle when the movable portion 201*k* is rotated with the bending portion 201*i* as a rotating shaft.

Operation of the microprobe 200 and the scanning probe apparatus 20 using thereof according to Embodiment 2, mentioned above, is similar to that in Embodiment 1 and accordingly, an explanation thereof will be omitted here. However, according to Embodiment 2, as shown by a bold line in FIG. 7, in heater OFF state, the movable portion 201*k* is brought into a state in which the movable portion 201*k* is not rotated with the bending portion 201*i* as the rotating shaft and in heater ON state, as shown by a two-dotted chain line in the drawing, at a portion of the movable portion 201*k* proximate to the metal contact portion 207, a force by bending the heater laminating portion 201*f* is operated in minus z-axis direction, there is brought about a state in which the movable portion 201*k* is rotated with the bending portion 201*i* as the rotating shaft.

Figure 7:
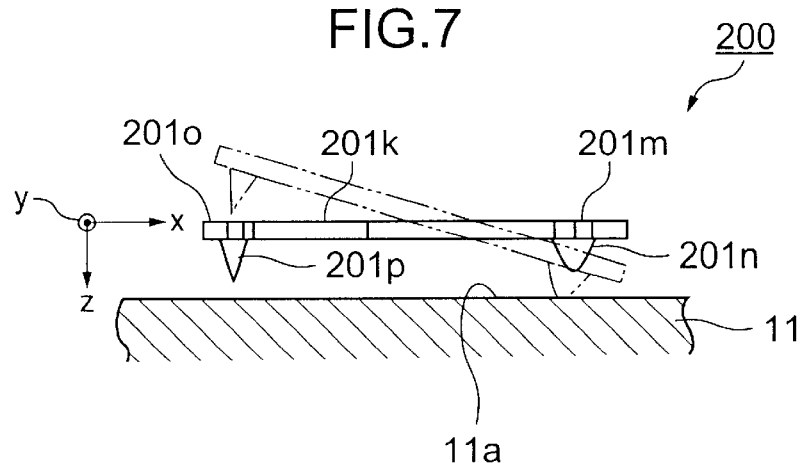
FIG. 7 is a side view for explaining operation of the microprobe 200 according to Embodiment 2.

That is, in heater ON state, by rotating the movable portion 201*k*, as shown by the two-dotted chain line in FIG. 7, the high resolution stylus 201*p* is separated from the sample surface 11*a* and the low resolution stylus 201*n* becomes proximate to the sample surface 11*a* and the low resolution wide area measuring mode by the low resolution stylus 201*n* becomes effective.

Therefore, according to the microprobe 200 and the scanning type probe apparatus 20 using thereof according to Embodiment 2, explained above, the movable portion 201*k* having the low resolution stylus 201*n* and the high resolution stylus 201*p* and the piezoresistive element $204_1$ and the piezoresistive element $204_2$ for detecting the bending amount of the movable portion 201*k* are integrally constituted and accordingly, alignment adjustment at each measuring operation can be dispensed with since conventional optical constituent elements for detecting bending amounts are dispensed with.

(Embodiment 3)

Next, an explanation will be given of a microprobe according to Embodiment 3 of the invention. A microprobe according to Embodiment 3 is other example of a microprobe for detecting a bending amount of a cantilever portion by a piezoresistive element and having two kinds of styluses having different degrees of sharpness. Particularly, the microprobe according to Embodiment 2 differs from Embodiment 1 in that in the above-described microprobe 100, there are not provided constitutions in correspondence with the high resolution cantilever portion 130, the bending portions 130*a* and 130*b*, the movable portion 130*c*, the piezoresistive elements 131 and 132, the metal contact portion 135, 136, 138 and 139 and the conductive film 137 and there are formed both of two kinds of styluses in correspondence with the low resolution stylus 111*g* and the high resolution stylus 130 at a portion thereof in correspondence with the movable portion 111*f*. However, either one of portions thereof in correspondence with the heater laminating portions 111*a* or 111*b* is not functioned.

Figure 8:
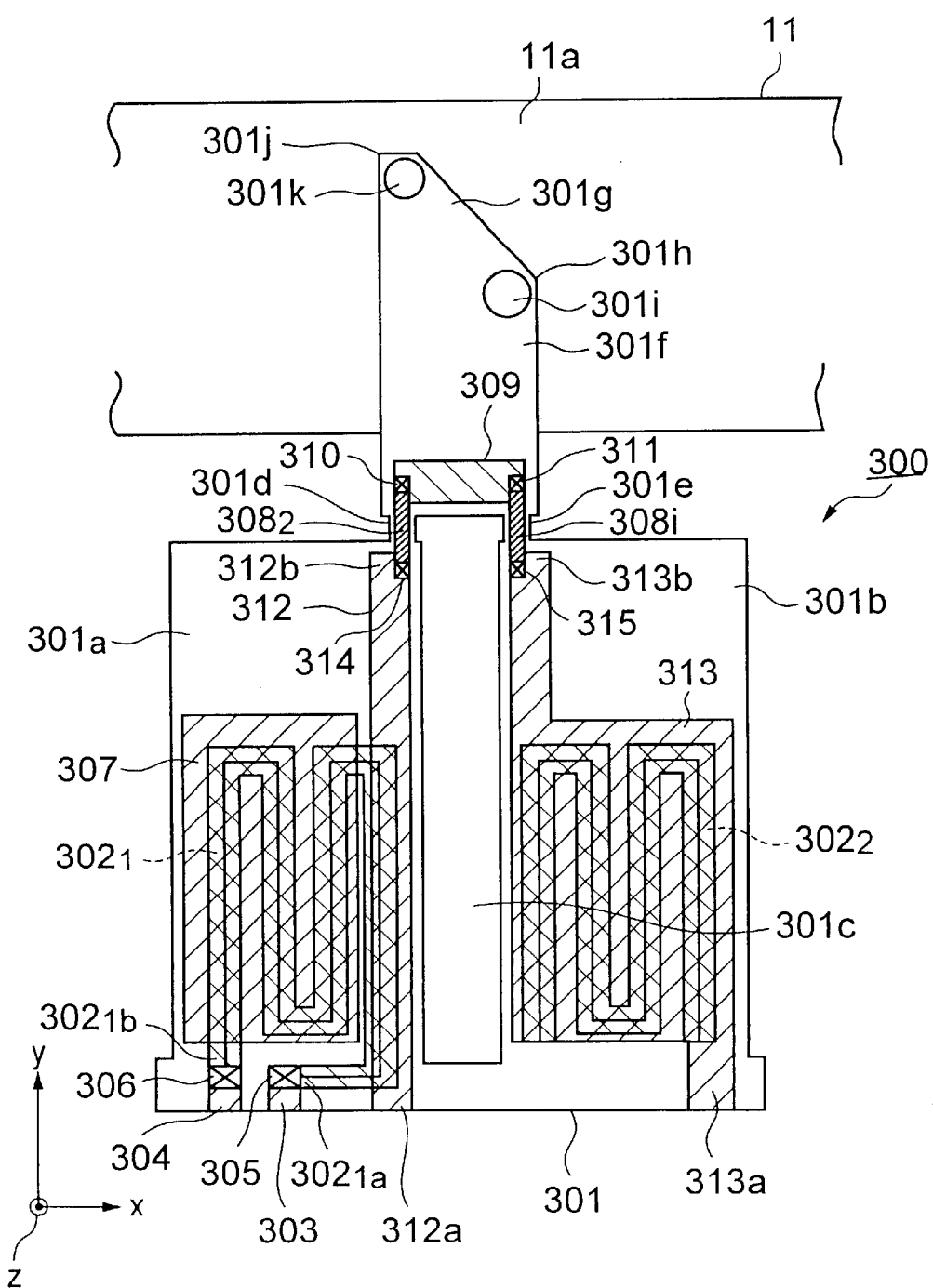
FIG. 8 is a plane view showing the constitution of the microprobe 300 according to Embodiment 3.

FIG. 8 is a plane view showing a constitution of a microprobe 300 according to Embodiment 3 of the invention. Further, according to a scanning type probe apparatus 30 using a microprobe 300 according to Embodiment 3, there is used the microprobe 300 in place of the microprobe 100 shown in FIG. 1.

The microprobe 300 is fabricated by a silicon material and is integrally formed with a support portion 301, a fixing portion 301*b* in a plate-like shape supported by an end edge of the support portion 301 in y-axis direction, a heater laminating portion 301*a* similarly supported by the end edge of the support portion 301, and a movable portion 301*f* supported flexibly in z-axis direction and rotatably around y axis via a bending portion 301*d* and a bending portion 301*e* at one corner portion of the heater laminating portion 301*a* and one corner portion of the fixing portion 301*b*. The heater laminating portion 301*a* is formed in a plate-like shape and is arranged symmetrically with the fixing portion 301*b* in the left and right direction with a clearance 301*c* formed between the heater laminating portion 301*a* and the fixing portion 301*b* as a boundary.

Further, the movable portion 301*f* is formed substantially in a trapezoidal shape and both end portions of an oblique side portion 301*g* inclined to x axis by a predetermined angle (a corner portion 301*h* for low resolution and a corner portion 301*j* for high resolution), are formed with a stylus 301*i* for low resolution and a stylus 301*k* for high resolution respectively in correspondence with the low resolution stylus 111*g* and the high resolution stylus 130*e* in Embodiment 1.

Similar to Embodiment 1, the heater laminating portion 301*a* is formed with a heater portion $302_1$ comprising a piezoresistive element, which plays a role of heating the heater laminating portion 301*a* by supplied current. Further, a side of one end portion $302_{1a}$ and a side of other end portion $302_{1b}$ of the heater portion $302_1$ are formed in thin films on a surface of the support portion 301.

The one end portion $302_{1a}$ of the heater portion $302_1$ is electrically connected to a conductive film 303 formed in a thin film on the surface of the support portion 301 via a metal contact portion 305. Similar thereto, the other end portion $302_{1b}$ is electrically connected to a conductive film 304 formed in a thin film on the surface of the support portion 301 via a metal contact portion 306.

Further, the one end portion $302_{1a}$ and the other end portion $302_{1b}$ of the heater portion $302_1$ are electrically connected to the heater drive unit 15 shown in FIG. 1 and when the low resolution stylus 301$i$ is used, the heater drive unit 15 applies voltage to the one end portion 302$_{1a}$ and the other end portion 302$_{1b}$.

An aluminum film 307 is formed in a thin film on a surface of the heater laminating portion 301$a$ to substantially cover a total face of the heater portion 302$_1$. Further, as shown in FIG. 3 of Embodiment 1, an insulating layer, not illustrated, is formed between the aluminum film 307 and the heater portion 302$_1$. Therefore, by the insulating layer, there is ensured electric insulation between the aluminum film 307 and the first heater wiring 302$_1$. Further, the aluminum film 307 achieves a function for efficiently transmitting heat generated at the heater portion 302$_1$ to a surface of a silicon substrate.

A piezoresistive element 308$_1$ and a piezoresistive element 308$_2$ are for detecting changes in the bending portion 301$e$ and the bending portion 301$d$ similar to the respective piezoresistive elements explained in Embodiment 1.

A conductive film 309 is formed in a thin film and in a strip-like shape on a surface of the movable portion 301$f$ and along the clearance 301$c$ and plays a role as a wiring for connecting the piezoresistive element 308$_1$ and the piezoresistive element 308$_2$. In this case, one end portion of the conductive film 309 and other end portion of the piezoresistive element 308$_1$ are electrically connected via a metal contact portion 311 and other end portion of the conductive film 309 and other end portion of the piezoresistive element 308$_2$ are electrically connected via a metal contact portion 310.

A conductive film 312 is formed in a thin film on a surface from a vicinity of the bending portion 301$d$ to the support portion 301 via the heater laminating portion 301$a$ and plays a role as a wiring. Other end portion 312$b$ of the conductive film 312 is electrically connected to one end portion of the piezoresistive element 308$_2$ via a metal contact portion 314. In this case, an insulating layer (not illustrated) is formed between the conductive film 312 and the heater portion 302$_1$ and by the insulating layer, insulation between the conductive film 312 and the heater portion 302$_1$ is ensured.

Meanwhile, at the fixing portion 301$b$, a heater portion 302$_2$ is formed in a thin film substantially in a wavy shape on a surface of the fixing portion 301$b$. However, the heater portion 302$_2$ is not electrically connected to any portions and is not used actually. This is in consideration of weight balance of the microprobe 300 in the left and right direction.

A conductive film 313 is formed in a thin film on a surface from a vicinity of the bending portion 301$e$ to the support portion 301 via the fixing portion 301$b$ and plays a role as a wiring. Other end portion 313$b$ of the conductive film 313 is electrically connected to one end portion of the piezoresistive element 308$_1$ via a metal contact portion 315.

Further, one end portion 313$a$ of the conductive film 313 and one end portion 312$a$ of the conductive film 312 are connected to the measuring unit 16 shown in FIG. 1. Further, according to the microprobe 300 shown in FIG. 8, a line segment connecting the low resolution stylus 301$i$ and the high resolution stylus 301$k$ is formed to be inclined by a predetermined angle to a line segment connecting the bending portion 301$e$ and the bending portion 301$d$. This is for increasing a rotational angle when the movable portion 301$f$ is rotated with the bending portion 301$e$ as a rotating axis, mentioned later, as described in Embodiment 2.

With respect to operation of the microprobe 300 and the scanning type probe apparatus 30 using thereof according to Embodiment 3, mentioned above, operation is similar to that in Embodiment 2 and accordingly, an explanation thereof will be omitted here. However, according to Embodiment 3, in a heater OFF state, as shown by a bold line in FIG. 9, the movable portion 301$f$ is brought into a state in which rotation with the bending portion 301$e$ as the rotating shaft is not carried out and in a heater ON state, as shown by a two-dotted chain line in the drawing, by operating a force produced by bending the heater laminating portion 301$a$ in minus z-axis direction at a portion of the movable portion 301$f$ proximate to the metal contact portion 310, there is brought about a state in which the movable portion 301$f$ is rotated with the bending portion 301$e$ as the rotating shaft.

Figure 9:
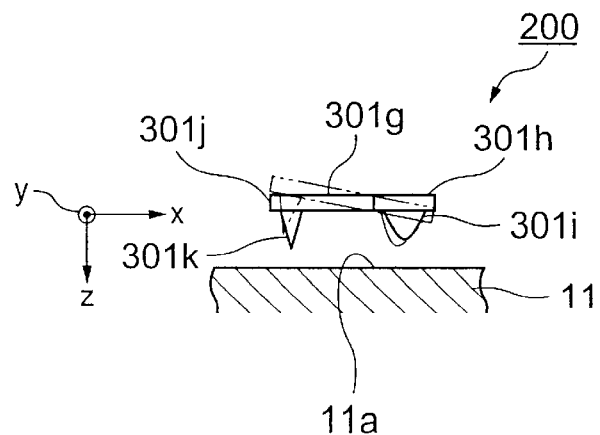
FIG. 9 is a side view explaining operation of the microprobe 300 according to Embodiment 3.

That is, in the heater ON state, by rotating the movable portion 301$f$, as shown by the two-dotted chain line in FIG. 9, the high resolution stylus 301$k$ is separated from the sample surface 11$a$, the low resolution stylus 301$i$ approaches the sample surface 11$a$ and the low resolution wide area measuring mode by the low resolution stylus 301$i$ becomes effective.

Figure 10:
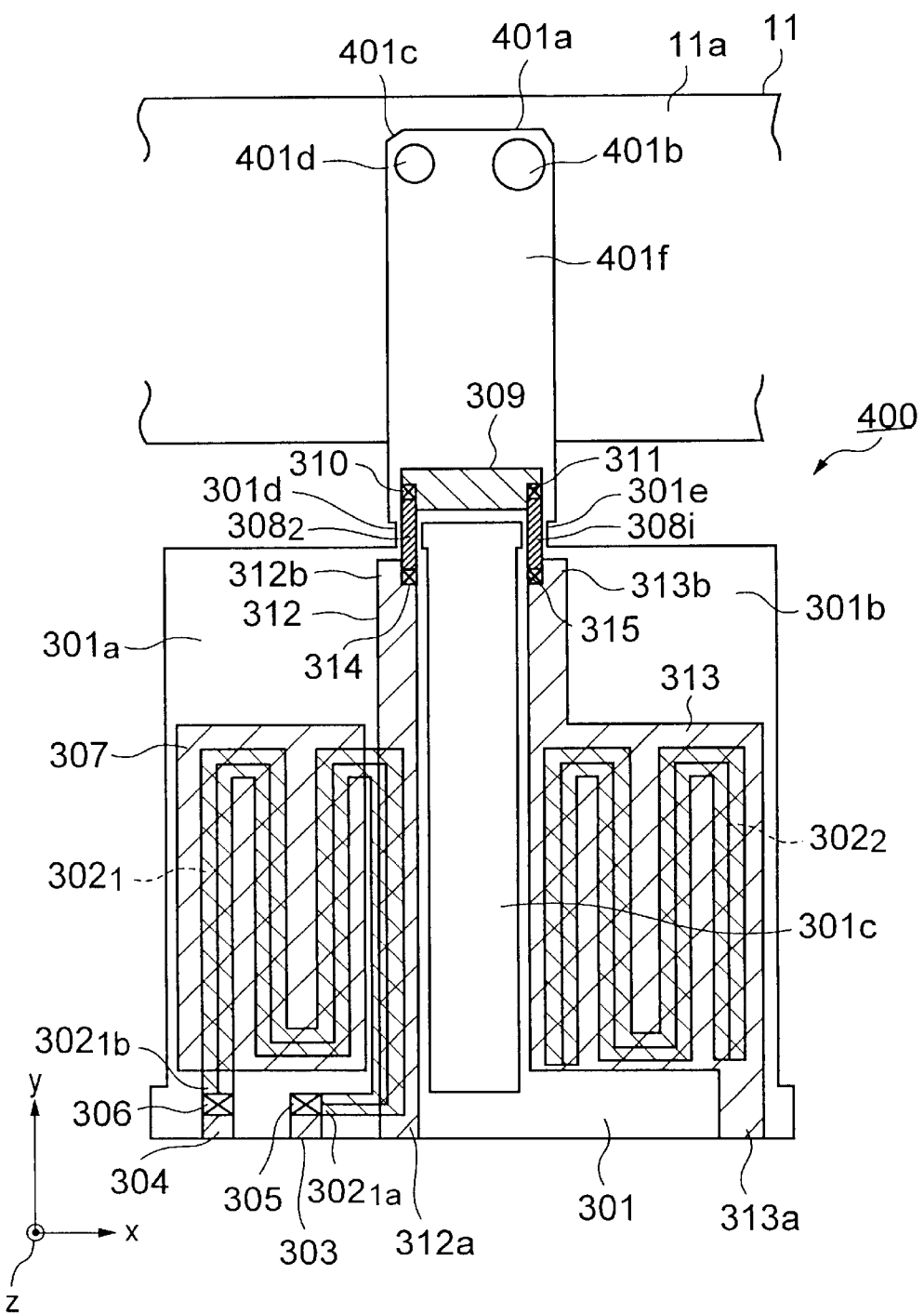
FIG. 10 is a plane view showing the constitution of the microprobe 400 according to Embodiment 3.

Although in the case of the microprobe 300 according to Embodiment 3, explained above, the shape of the movable portion 301$f$ is constituted by substantially the trapezoidal shape, as shown in FIG. 10, the portion can also be formed in a rectangular shape. According to a microprobe 400 shown in FIG. 10, a movable portion 401$f$, a corner portion 401$a$ for low resolution, a corner portion 401$c$ for high resolution, a stylus 401$b$ for low resolution and a stylus 401$d$ for high resolution successively correspond respectively to the movable portion 301$f$, the low resolution corner portion 301$h$, the high resolution corner portion 301$j$, the low resolution stylus 301$i$ and the high resolution stylus 301$k$, the other portions are provided with the same functions and attached with notation the same as those in FIG. 8 and accordingly, an explanation thereof will be omitted here. Further, according to a scanning type probe apparatus 40 using the microprobe 400, in place of the microprobe 100 shown in FIG. 1, the microprobe 400 is used.

Figure 11:
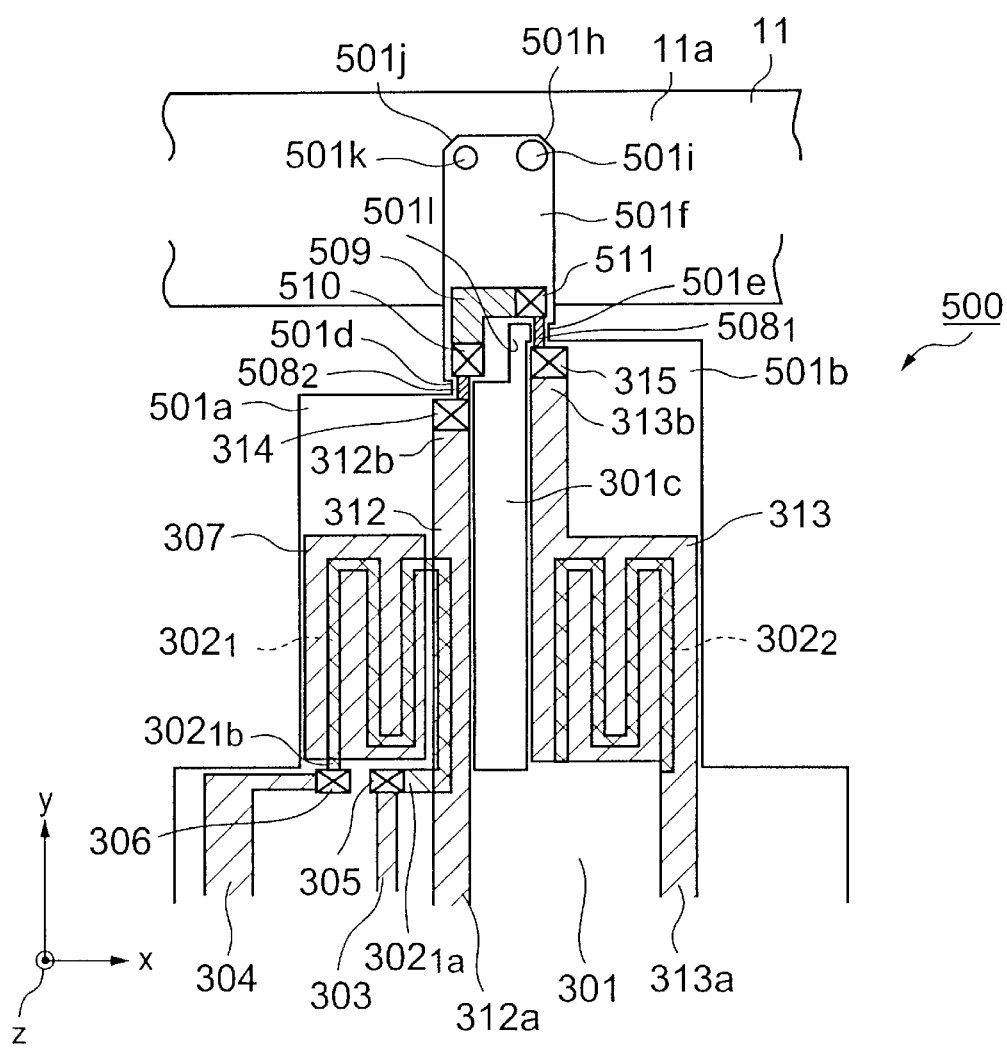
FIG. 11 is a plane view showing the constitution of the microprobe 500 according to Embodiment 3.
Figure 12:
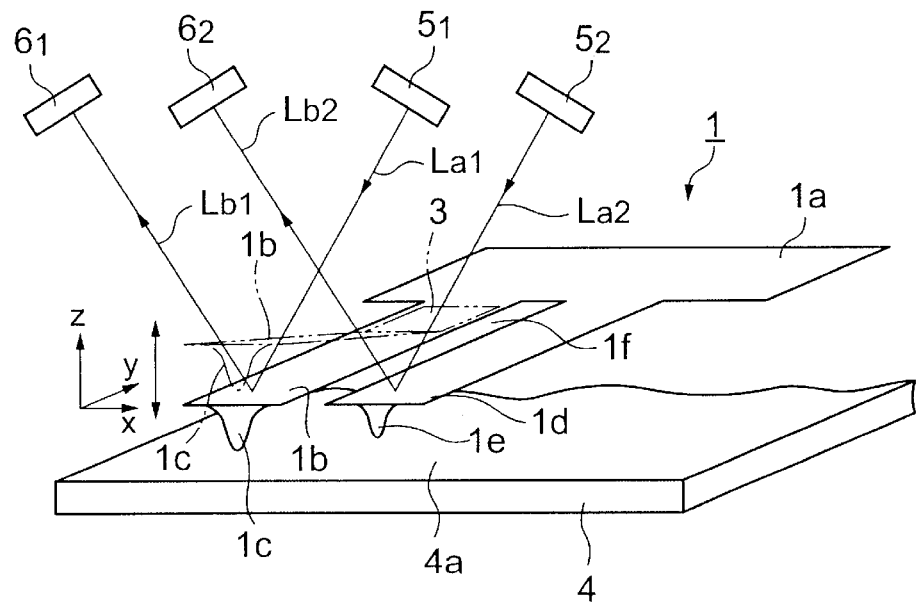
FIG. 12 is a perspective view showing constitutions of essential portions of a conventional microprobe 1 and a scanning type probe apparatus using thereof.
Figure 13:
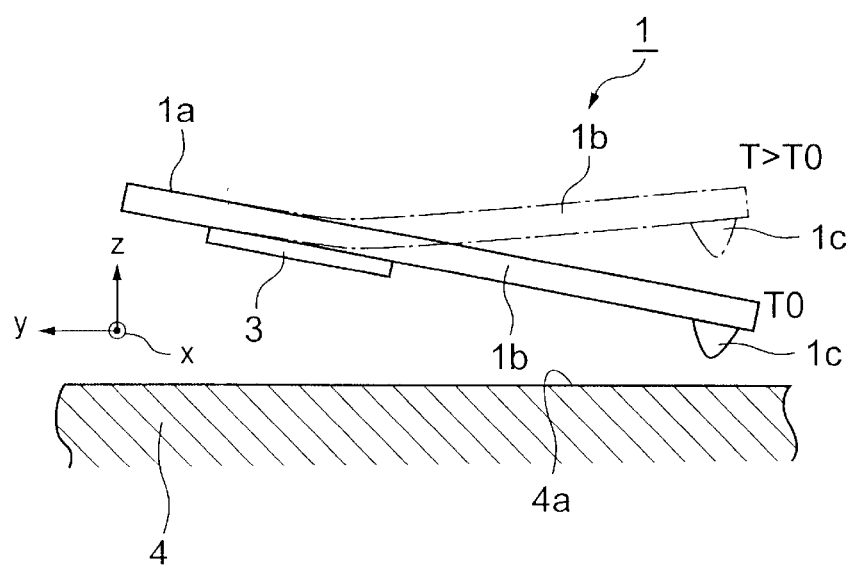
FIG. 13 is a side view for explaining operation of the conventional microprobe 1.

Further, the shape of a movable piece 401 can be made different and at the heater laminating portion 301$a$ and the fixing portion 301$b$, lengths in directions projected from the support portion 301 (longitudinal direction) can also be made to differ from each other. FIG. 11 is a plane view showing a constitution of a microprobe 500 in this case.

In FIG. 11, a movable portion 501$f$, a corner portion 501$h$ for low resolution, a corner portion 501$j$ for high resolution, a stylus 501$i$ for low resolution, a stylus 501$k$ for high resolution, a conductive film 509, metal contact portions 510 and 511, bending portions 501$d$ and 501$e$, piezoresistive elements 508$_1$ and 508$_2$, a heater laminating portion 501$a$ and a fixing portion 501$b$, successively correspond to the movable portion 401$f$, the low resolution corner portion 401$a$, the high resolution corner portion 401$c$, the low resolution stylus 401$b$, the high resolution stylus 401$d$, the conductive film 309, the metal contact portions 310 and 311, the bending portions 301$d$ and 301$e$, the piezoresistive elements 308$_1$ and 308$_2$, the heater laminating portion 301$a$ and the fixing portion 301$b$ shown in FIG. 10, the other portions are provided with the same functions and are attached with notations the same as those in FIG. 8 and accordingly, an explanation thereof will be omitted here.

Particularly, the above-described fixing portion 501$b$ is formed substantially in a plate-like shape with a length in the longitudinal direction longer than that of the heater laminating portion 501$a$, and the movable portion 501$f$ is formed substantially in a plate-like shape and is provided with a notch portion 501$l$ notched at the right lower portion thereof in the drawing. Further, a line segment connecting the low resolution stylus 501$i$ and the high resolution stylus 501$j$, is formed to be inclined by a predetermined angle to a line segment connecting the bending portion 501e and the bending portion 501d. This is for increasing a rotational angle when the movable portion 501f is rotated with the bending portion 501e as a rotating shaft.

Further, according to the scanning type probe apparatus 30 using the microprobe 300 according to Embodiment 3, in place of the microprobe 100 shown in FIG. 1, the microprobe 300 is used.

As has been explained above, according to the microprobe 300 (400, 500) and the scanning type probe apparatus 30 (40, 50) according to Embodiment 3, mentioned above, the bending amount of the movable portion 301f (401f, 501f) by the low resolution stylus 301i (401b, 501i) and the high resolution stylus 301k (401d, 501j), is detected by respective resistance values of the piezoresistive element $308_1$ ($508_1$) and the piezoresistive element $308_2$ ($508_2$) and accordingly, in comparison with the conventional constitution of optically detecting the bending amount, the constitution can be simplified and measurement accuracy of the sample surface 11a can be promoted.

Further, according to the microprobe 300 (400, 500) and the scanning type probe apparatus 30 (40, 50) using thereof according to Embodiment 3, mentioned above, the movable portion 301f (401f, 501f) having the low resolution stylus 301i (401b, 501i) and the high resolution stylus 301k (401d, 501j) and the piezoresistive element $308_1$ ($508_1$) and the piezoresistive element $308_2$ ($508_2$) for detecting the movable portion 3 of (401f, 501f), are integrally constituted and accordingly, conventional optical constituent elements for detecting the bending amount can be dispensed with and accordingly, alignment adjustment for each measurement can be dispensed with.

Although a detailed description has been given of the microprobes 100, 200, 300, 400 and 500 according to Embodiments 1, 2 and 3 of the invention in reference to the drawings as mentioned above, even when there is a change in design or the like in the range not deviated from the gist of the invention, the change is included in the invention.

For example, although an explanation has been given of examples of using the aluminum film 203 (refer to FIG. 6) and the aluminum film 307 (refer to FIG. 8, FIG. 10 and FIG. 11) in Embodiments 1 through 3, mentioned above, in place of aluminum, copper or nickel may be used.

As has been explained above, in a microprobe according to one aspect of the invention the bending amounts of the first and the second cantilever portions or the first and the second lever portions are detected based on the resistance values of the piezoresistive elements and accordingly, there is achieved an effect in which in comparison with the conventional method of optically detecting the bending amount, the construction can be simplified by not using optical constituent elements and measurement accuracy of the sample surface can be promoted.

Further, according to another aspect of the invention, there is first and second cantilever portions or first and second lever portions and the piezoresistive elements for detecting the bending amounts are integrated and accordingly, there is achieved a benefit by dispensing with the need for alignment adjustment for each measurement since conventional optical constituent elements for detecting the bending amounts are dispensed with.

According to a further aspect of the invention, the bending amounts of the first and the second cantilever portions are detected based on the resistance values of the first and the second piezoresistive elements and accordingly, there is achieved an effect in which in comparison with the conventional method of optically detecting the bending amount, the construction can be simplified by not using the optical constituent elements and measurement accuracy of the sample surface can be promoted.

Further, according to the microprobe in still another aspect, the line segment connecting a stylus having a first degree of sharpness and a stylus having a second degree of sharpness is inclined by a predetermined angle to the line segment connecting the first bending portion and the second bending portion and accordingly, there is achieved an effect in which the rotational amount in rotating the movable portion with the second bending portion as the rotating shaft is increased and the styluses can be switched efficiently.

According to the microprobe in still yet another aspect of the invention, the resistance heat generated by flowing current to the piezoresistive element is utilized as the heating means and accordingly, the heating means can be driven electrically and bending of the lever portion of the microprobe can easily be controlled.

In a scanning type probe apparatus having any one of the foregoing microprobes by driving the heating means provided at the microprobe, the desired stylus can be selected in accordance with the object under observation and there is achieved an effect of eliminating the troublesome operation of interchanging the microprobe.

What is claimed is:

1. A microprobe for a scanning probe microscope, comprising: a support portion; a first lever portion supported by the support portion; a second lever portion supported by the support portion adjacent to and spaced from the first lever portion; a first bending portion connected to and separate from the first lever portion; a second bending portion connected to and separate from the second lever portion and adjacent to and spaced from the first bending portion; a movable portion connected to both the first bending portion and the second bending portion; a first stylus and a second stylus provided on the movable portion, the second stylus being closer to the second bending portion than to the first bending portion; heating means provided only on the surface of the first lever for applying heat to the surface of the first lever portion so as to bend the first lever portion and the first bending portion and separate the first stylus of the movable portion from a sample to thereby permit sample inspection using the second stylus unimpeded by the first stylus; and piezoresistive elements disposed at the first and second bending portions so that a bending amount of the movable portion is detectable as a change in resistance values of the piezoresistive elements.

2. A microprobe according to claim 1, wherein the first stylus has a first degree of sharpness and the second stylus has a second degree of sharpness different from the first; and the first and second styluses are arranged on the movable portion such that a line segment connecting the respective styluses is inclined by a predetermined angle with respect to a shortest line segment connecting the first bending portion and the second bending portion.

3. A microprobe according to either of claims 1 or 2; wherein the heating means comprises one of the piezoresistive elements, which generates heat by flowing a current therethrough.

4. A scanning type probe apparatus comprising: a microprobe according to either of claims 1 or 2 for observing a sample surface; means for detecting a bending amount of the microprobe caused by forces acting between a stylus of the microprobe and the sample surface when the stylus is brought into close proximity to the sample surface; and driving means for driving the heating means.

5. A microprobe according to claim 1; wherein the support portion, the movable portion, the first lever portion, the second lever portion, the first bending portion and the second bending portion are formed of an etched semiconductor substrate.

6. A microprobe according to claim 5; wherein the heating means comprises a piezoelectric resistor implanted in the semiconductor substrate, an insulating film covering the piezoelectric resistor, and a conductive film formed over the insulating film.

7. A microprobe according to claim 6; wherein the piezoelectric resistor of the heating means comprises the piezoresistive element formed in the first lever portion.

8. A microprobe according to claim 1; wherein the first stylus is sharper than the second stylus.

9. A microprobe comprising: a support portion; a first lever portion supported by the support portion; a second lever portion supported by the support portion adjacent to and spaced from the first lever portion; a first bending portion connected to and separate from the first lever portion; a second bending portion connected to and separate from the second lever portion and adjacent to and spaced from the first bending portion; a movable portion connected to the first bending portion and the second portion so as to be flexibly supported by the support portion; a first stylus and a second stylus provided on the movable portion; and a heater for heating the first lever portion to cause it to bend so that one of the first stylus and the second stylus is retracted with respect to the other stylus for conducting sample inspection with the other stylus in close proximity to a sample surface unobstructed by the one stylus.

10. A microprobe according to claim 9; wherein the styluses are arranged on the movable portion such that a line segment connecting the styluses is inclined by a predetermined angle with respect to a shortest line segment connecting the first and second bending portions.

* * * * *